US006562517B1

(12) United States Patent
Misra et al.

(10) Patent No.: US 6,562,517 B1

(45) Date of Patent: May 13, 2003

(54) LEAD-ACID BATTERY VENT VALVE-CATALYST CARRIER ASSEMBLY

(75) Inventors: Sudhan S. Misra, North Wales, PA (US); Franz M. Wagner, Zionsville, IL (US)

(73) Assignee: C&D Charter Holdings, Inc., Wilmington, DE (US)

(*) Notice: Subject to any disclaimer, the term of this patent is extended or adjusted under 35 U.S.C. 154(b) by 0 days.

(21) Appl. No.: 09/212,225

(22) Filed: Dec. 16, 1998

Related U.S. Application Data

(60) Provisional application No. 60/069,807, filed on Dec. 17, 1997.

(51) Int. Cl.[7] .......... H01M 2/12

(52) U.S. Cl. .......... 429/225; 429/57; 429/86

(58) Field of Search .......... 429/57, 58, 86, 429/88, 225, 59

(56) References Cited

U.S. PATENT DOCUMENTS

| | | | | |
|---|---|---|---|---|
| 1,527,426 A | | 2/1925 | Cook | |
| 1,920,261 A | | 8/1933 | Lavender | 136/177 |
| 2,480,861 A | | 9/1949 | Jaworski et al. | 136/180 |
| 2,516,084 A | | 7/1950 | Wells | 136/162 |
| 2,894,524 A | | 7/1959 | Gill | 137/43 |
| 3,944,437 A | | 3/1976 | Auerbach | 136/179 |
| 4,068,043 A | * | 1/1978 | Carr | |
| 4,246,324 A | * | 1/1981 | de Nora et al. | |
| 4,374,907 A | | 2/1983 | Chuang et al. | 429/57 |
| 4,606,982 A | * | 8/1986 | Nelson et al. | |
| 4,637,966 A | * | 1/1987 | Uba et al. | |
| 4,769,299 A | * | 9/1988 | Nelson | |
| 4,871,428 A | * | 10/1989 | Misra et al. | |
| 5,068,160 A | * | 11/1991 | Clough et al. | |
| 5,182,178 A | * | 1/1993 | Brizendine et al. | |
| 5,185,221 A | * | 2/1993 | Rampel | |
| 5,682,671 A | * | 11/1997 | Lund et al. | |
| 5,768,906 A | * | 6/1998 | Tsenter | |
| 5,981,099 A | | 11/1999 | Bourbeau | 429/53 |
| 6,051,332 A | | 4/2000 | Verhoog et al. | 429/54 |

FOREIGN PATENT DOCUMENTS

| | | |
|---|---|---|
| JP | 356168366 A | 12/1981 |
| JP | 361188855 A | 8/1986 |
| JP | 362115652 A | 5/1987 |
| JP | 362115653 A | 5/1987 |
| JP | 362115654 A | 5/1987 |
| JP | 401248456 A | 10/1989 |
| JP | 402037663 A | 2/1990 |
| WO | WO 99/41798 | 8/1999 |

OTHER PUBLICATIONS

David Linden, Handbook of Batteries, Second Edition, McGraw–Hill, Inc., New York 1995, p. 23.7.

* cited by examiner

*Primary Examiner*—Tom Dunn
*Assistant Examiner*—Jonathan Johnson

(57) ABSTRACT

A recombinant lead-acid battery, and method for operating thereof, are provided wherein the battery includes a case with a a plurality of lead-acid cells therewithin. The cells are in vapor communication one with another, and in vapor communication with discrete catalyst units. The catalyst units act to enhance recombination within the case of hydrogen and oxygen into vapor phase water. The number of discrete catalyst units is fewer than the cells.

5 Claims, 7 Drawing Sheets

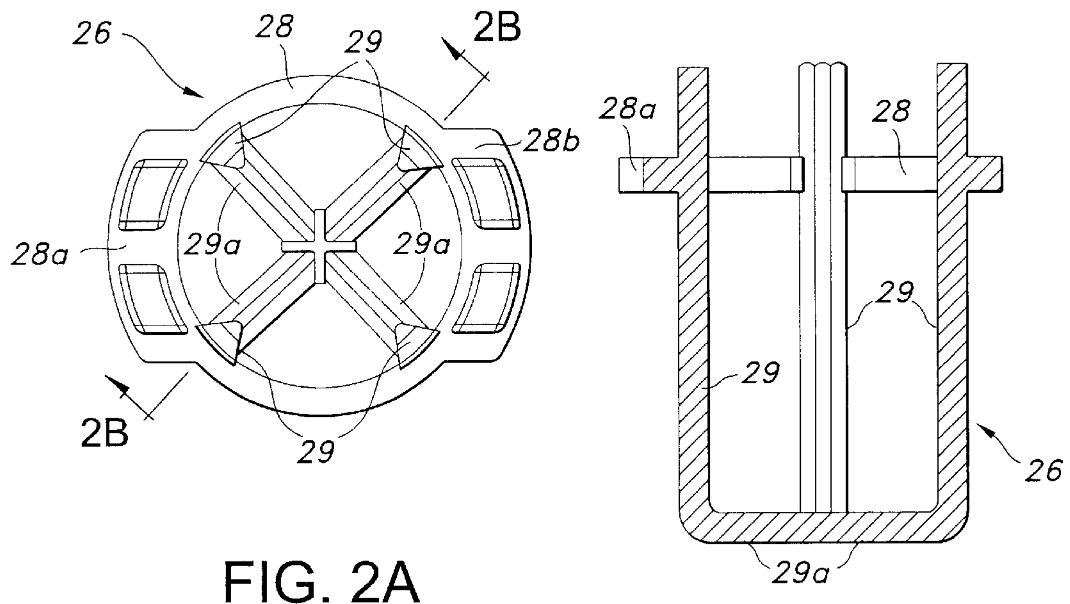
FIG. 2A
FIG. 2B
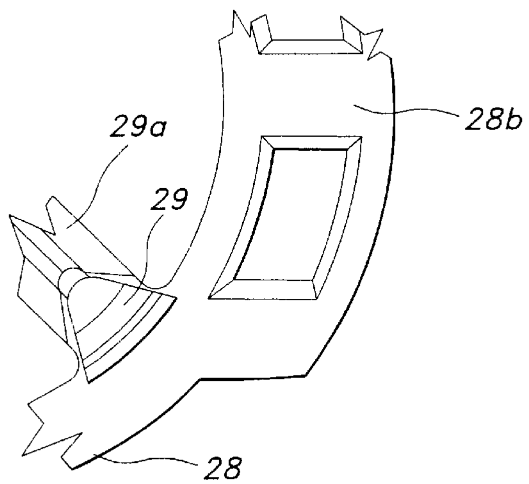
FIG. 2C

LEAD-ACID BATTERY VENT VALVE-CATALYST CARRIER ASSEMBLY

CROSS-REFERENCE TO RELATED APPLICATIONS

Priority of U.S. provisional patent application serial No. 60/069,807, filed Dec. 17, 1997, is claimed under 35 U.S.C. §120; the disclosure of provisional patent application serial No. 60/069,807 is incorporated by reference herein.

BACKGROUND OF THE INVENTION

This invention relates to lead-acid batteries, particularly to valve-regulated lead-acid batteries including catalysts which aid in the recombination of hydrogen with oxygen within the battery.

Certain catalysts are known to aid in the recombination of hydrogen with oxygen within a lead-acid battery environment. These catalysts, which are generally noble metals, with palladium being preferred, serve to "mop up" the hydrogen and to recombine hydrogen released in the course of battery operation with oxygen to make water.

This recombination serves to counteract loss of water during battery operation. Loss of water would otherwise occur if the hydrogen were left to remain in a free state. This is because free hydrogen can actually diffuse through the case of the battery and escape to atmosphere. Loss of hydrogen is a function of relative partial pressure of hydrogen inside and outside of the battery case. The small size of hydrogen molecules permits them to diffuse through nearly any non-metallic material, including the plastics widely used to fabricate lead-acid battery cases. Hence, if free hydrogen is not captured and recombined with oxygen, the net result is loss of water by the battery with the battery eventually drying out and failing.

Typically, catalyst material is provided in the form of pellets in order to maximize the surface area of the catalyst available for effectuating the catalytically recombining reaction of hydrogen with oxygen within the battery.

SUMMARY OF THE INVENTION

In one of its aspects, this invention provides a recombinant lead-acid battery having a case, a plurality of lead-acid cells within the case, where each cell includes a plurality of positive and negative lead metal plates, and absorbent separator material between at least some of the positive and negative plates. The case may include partitions for separating adjacent cells one from another with portions of the partitions being spaced from the case to define space for vapor migration among cells. The battery preferably further includes a catalyst unit removably connected to the case and communicating with the vapor migration space for enhancing recombination of hydrogen and oxygen in the water at least partially in vapor phase within the battery. The catalyst unit is preferably at least partially within the case. The catalyst is preferably palladium.

In another of its aspects, this invention provides a recombinant lead-acid battery including a case, a plurality of lead-acid cells within the case, where each cell comprises positive and negative Lead metal plates, and absorbent separator material between at least some of the positive and negative plates. The cells are preferably in vapor communication one with another. The battery further preferably includes a plurality of optionally removable catalyst units in vapor communication with the cells for enhancing recombination of hydrogen and oxygen into water at least partially in vapor phase within the battery where the plurality of catalyst units is preferably no greater than the number of lead-acid cells. At least some of the catalyst units are preferably at least partially within the battery case. Some of the catalyst units may be completely within the battery case.

The catalyst is preferably palladium.

In yet another of its aspects, this invention embraces a method for operating a recombinant lead-acid battery having a case, a plurality of lead-acid cells within the case, with each cell including positive and negative lead metal plates, and absorbent separator material between at least some of the positive and negative plates, where the method includes placing the cells in vapor communication one with another and placing a plurality of discrete catalyst units no greater than the number of cells in vapor communication with the cells, to enhance recombination of hydrogen and oxygen in the vapor phase water within the battery.

In yet another of its aspects, this invention provides a recombinant lead-acid battery including a case having at least one venting aperture therein, a plurality of positive and negative lead metal plates within the case and absorbent separator material between at least some of the positive and negative plates. The battery further includes a vent valve assembly within the aperture including valve means for relieving pressure internal of the battery in excess of a predetermined level above ambient, a catalyst cage extending into the case from the assembly within the aperture and catalyst material retained within the cage and in vapor communication with the plates for enhancing recombination of oxygen and hydrogen involved in the plates in the water within the battery.

In still another of its aspects, this invention provides a recombinant lead-acid battery including a case having at least one venting aperture therein, a plurality of lead-acid cells within the case with each cell including positive and negative lead metal plates and absorbent separator material between at least some of the positive and negative plates. At least some of the cells are preferably in vapor communication one with another. In this aspect of the invention, the battery further yet preferably includes a vent valve assembly within the aperture which is in vapor communication with the vapor communicating cells and includes a valve member for relieving pressure internal of the vapor communicating cells in excess of a predetermined level above ambient, a catalyst cage extending into the case from the valve assembly within the aperture and catalyst material retained within the cage and being in vapor communication with the communicating cells for enhancing recombination of hydrogen and oxygen evolved at the plates of the cells into water within the battery.

In yet another of its aspects this invention embraces a method for operating a recombinant lead-acid battery having a case, a plurality of lead-acid cells within the case with each cell including positive and negative lead metal plates and absorbent separator material between at least some of the positive and negative plates, comprising placing the cells in vapor communication one with another and placing a plurality of discrete catalyst units forming portions of vent valve assemblies into venting apertures in said case so that discrete catalyst unit portions of said vent valve assemblies are in vapor communication with said cells thereby enhancing recombination of hydrogen and oxygen into vapor phase water within the battery.

This invention in another one of its aspects provides a vent plug-catalyst carrier assembly for a lead-acid battery. The vent plug-catalyst carrier assembly may preferably be provided as an original equipment part of a lead-acid battery or may be easily retrofitted into lead-acid batteries already in commercial service, provided the battery case has structure for receiving and fixing in place a new vent structure.

In the apparatus aspect of the invention, a cage for the catalyst is preferably permanently affixed to the battery vent plug with the cage preferably permanently retaining a catalyst cartridge in a floating disposition within the cage. The cage is preferably disposed at the leading edge of a narrow neck structure extending into the vent hole. Floating disposition of the catalyst in the cage minimizes risk of cage fracture and catalyst destruction as the battery case expands and contracts due to pressure build-up within the battery, temperature changes, plate growth and the like.

The invention relates further to a vent valve-catalyst carrier combination structure for and in combination with a lead-acid battery. The vent valve preferably has a hollow tubular housing at least part of which preferably fits within a vent passage into the battery casing. Other parts of the tubular housing adjoin the casing such that a sealing member may be placed between the casing and vent valve. A barrier preferably extends across the housing for blocking passage of gases. The valve opening extends through the barrier and is normally covered by a flexible valve member. The valve member is preferably supported in normally closed position but arranged to yield to battery internal pressure of a predetermined level over atmospheric.

BRIEF DESCRIPTION OF THE DRAWINGS

FIG. 2A is an enlarged top view of the catalyst carrier and support structure separated from the battery vent valve assembly of FIGS. 1A, 1C and 1D.

FIG. 2B is a sectional view of the catalyst carrier and support structure taken along lines 2B—2B in FIG. 2A.

FIG. 2C is an enlarged partial view of the structure shown in lower right portion of FIG. 2A within dot and dash line 2*c*—2*c*.

DETAILED DESCRIPTION OF THE PREFERRED EMBODIMENTS AND

BEST MODE KNOWN FOR PRACTICING THE INVENTION IN ACCORDANCE WITH 35 U.S.C. §112

Figure 1B:
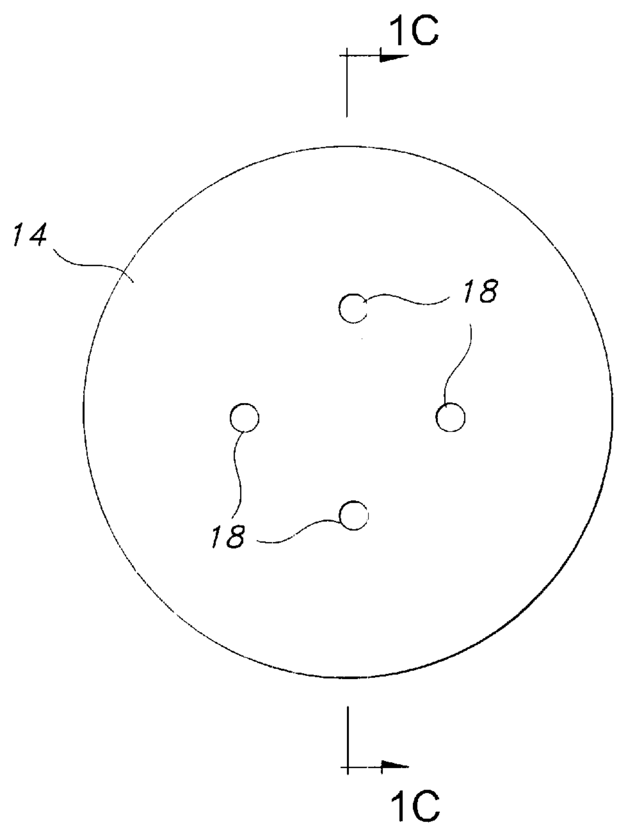
FIG. 1B is a top view of the structure of FIG. 1A.
Figure 1A:
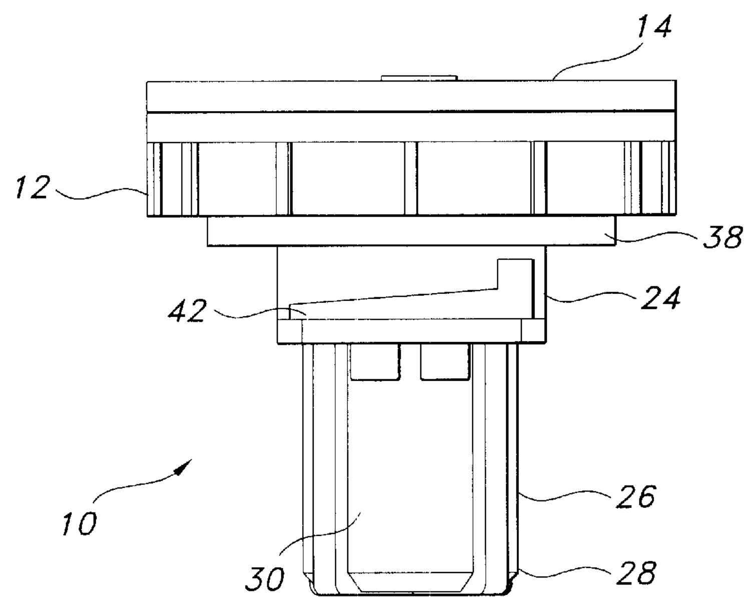
FIG. 1A is a side elevational view of the battery vent valve-catalyst: carrier assembly manifesting aspects of the invention.
Figure 1C:
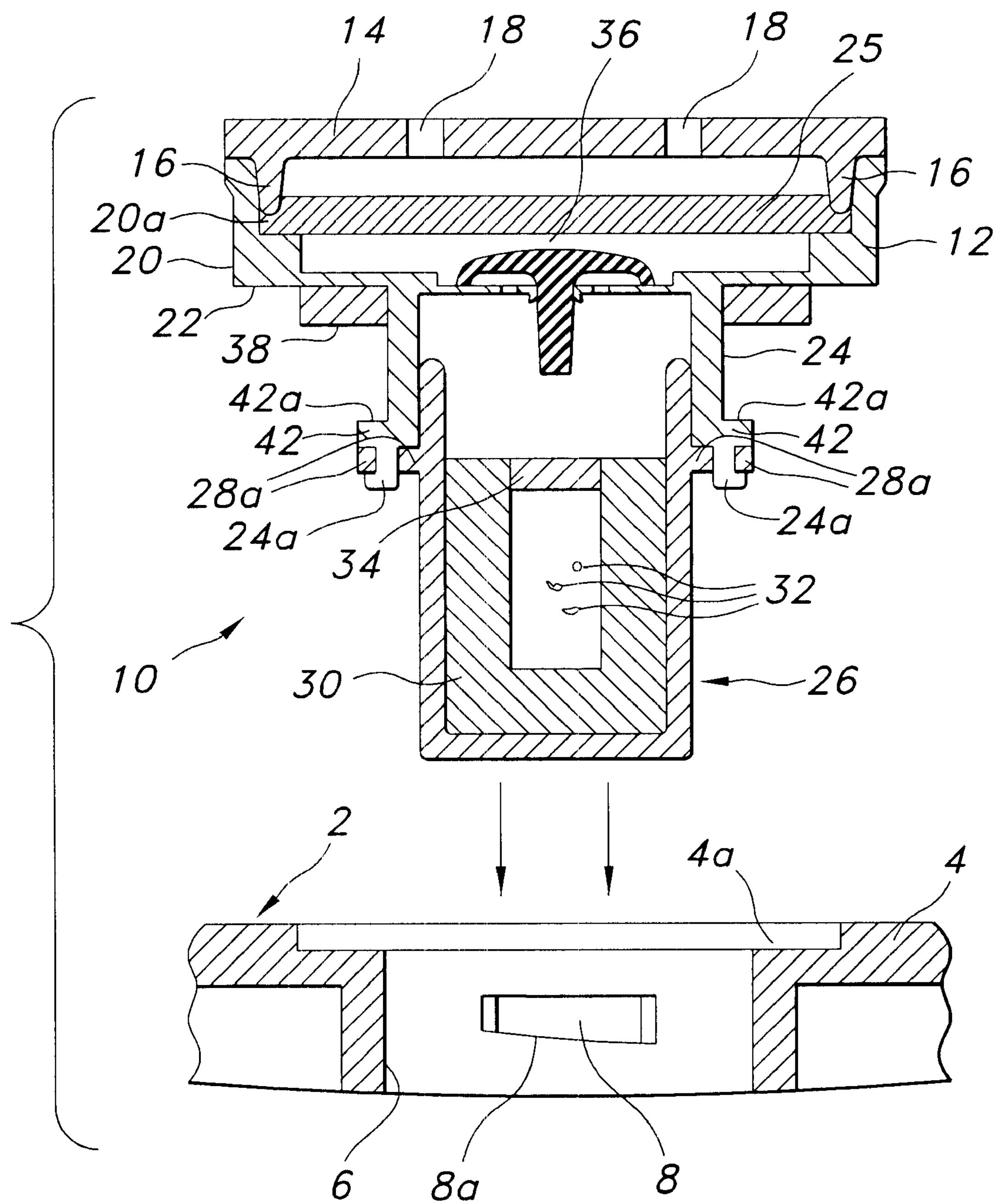
FIG. 1C is an enlarged sectional view of the battery vent valve assembly, taken along line 1C—1C of FIG. 1B, together with a partial sectional view of the vent hole portion of the cover of the battery case.

This invention provides a battery/vent valve assembly/catalyst carrier for carrying a hydrating catalyst for recombining residual gases produced during electrolytic reaction of lead-acid battery elements while simultaneously conserving liquid loss. The valve is positioned to provide pressure relief from inside the battery case 106 to atmosphere upon accumulation of gases above a certain pressure within battery 2, only a fragment of a cover 4 of which is shown in FIG. 1C. Battery 2 is preferably of the recombinant type employing positive and negative electrodes and electrolyte.

Plates of the same polarity are preferably connected together and preferably to a terminal penetrating cover 4 in a sealed relationship. The cover and case are preferably of the same molded resinous material, sealed together after assembly.

The vent valve-catalyst carrier assembly 10 preferably extends into battery 2 via cover 4 through an integrally molded cylindrical collar 6 to provide a vent opening 7, permitting venting of gases from inside case 106 when pressure exceeds a predetermined level. Hydrating catalyst support structure is supported at the internal end of the vent valve-catalyst carrier assembly 10 to promote recombining hydrogen and oxygen molecules so as to prevent water loss from battery 2.

A preferred embodiment of the battery vent valve-catalyst carrier assembly generally designated 10 is illustrated in FIGS. 1A to 1E. Vent valve-catalyst carrier assembly 10 is ready for installation into a battery through vent opening 7 in cover 4 as shown in FIG. 1C. The battery vent valve-catalyst carrier assembly 10 preferably includes a tubular molded resinous housing 12 having an upper generally cylindrical portion 13 and a lower generally cylindrical portion 15. Upper portion 13 defines a shallow cup-shaped vent body with cylindrical sidewalls 20 and a generally flat bottom 22. A valve, generally designated 36, lies on the cup axis and extends through a barrier integral with and extending across housing 12, in this case an extended cup bottom 22.

Lower cylindrical portion 15 defines a coaxial cylindrical neck 24 integrally molded with cup 12 from whose bottom 22 neck 24 extends. The top of cylindrical cup wall 20 is closed by a top cover 14, illustrated in FIG. 1B penetrated by small vent holes 18. A shoulder 20*a* formed in cylindrical side wall 20 supports a porous disk 25, preferably of porous polyethylene, which serves to block flames or sparks external to the battery casing from entering the casing. Top cover 14 is preferably frictionally coupled to the valve housing 12 by integrally mounted top cover tabs 16 positioned to fit snugly inside cup wall 20 to hold cover 14 in place. Top cover 14 and valve housing 12 are preferably molded polypropylene.

Neck portion 24 of valve housing 12 is dimensioned for fitting through a battery vent hole defined by integrally molded cylindrical collar 6 extending inward from battery cover 4 as seen in FIG. 1C. When assembled to the cover, the bottom of cup housing 12 rests atop the battery case cover in a recessed portion 4*a* with annular sealing gasket 38 positioned around neck portion 24. Sealing gasket 38 may preferably be polyvinyl chloride (PVC).

Collar 6 preferably carries opposed blocks 8 molded on its inside surface. The lower surface 8*a* of each block provides a cam surface 8*a*. The cylindrical neck 24 preferably has integrally molded on its outer cylindrical surface radially outwardly protruding cam blocks 42, providing locking cam shoulders beneath top surfaces 42*a* of blocks 42. The top surface 42*a* of cam shoulders cooperate with downwardly facing cam surfaces 8*a* on opposed cam blocks 8 (or bayonet locking pins in other embodiments) projecting inwardly at the appropriate level from and within collar 6. This enables vent valve-catalyst carrier assembly 10 to be secured in the vent opening of the battery casing by clockwise rotation.

Camming surfaces 8_a_ and 42_a_ cooperate conventionally, allowing blocks 42 and 8 to engage, coupling vent valve-catalyst carrier assembly 10 to battery casing vent collar 6. When seated on the gasket, battery vent valve-catalyst carrier assembly 10 is secured and sealed to battery case 4. Cylindrical neck 24 provides an inlet for channeling gas out of the battery to the outside atmosphere through valve apertures 60, shown in FIG. 1E, which are normally closed by a mushroom valve 76.

Lower cylindrical portion 15 supports catalyst cage 26 so that catalyst cage 26 extends further into the battery case. Catalyst cage 26 carries a hydrating catalyst 32 in a catalyst stone enclosure 30. Hydrating catalyst 32 may include pellets, flakes, or the like of one of the noble metals or noble metal alloys; the catalyst is preferably encased within a gas permeable catalyst stone enclosure 30. One suitable material for this enclosure is marketed by General Electric Company under the name "Raton". The catalyst enclosure is preferably cylindrical, having an open end which is filled with epoxy 34 to secure the pellets 32 of catalyst in place.

As seen in FIG. 2B, catalyst cage 26 is preferably injection molded in one piece of polypropylene copolymer. A collar section 28 which abuts the end of lower cylindrical portion 15 has integrally molded peripheral extensions 28_a_ and 28_b_. Each extension has conforming openings for snugly receiving integrally molded pins 24_a_ extending parallel to one another and to the axis from the bottoms of cam blocks 42. Once inserted through the conforming openings and moved into flush contact with the bottom of lower cylindrical portion 15, pins 24_a_ are heated and deformed to secure cage 26 to neck portion 24.

Cage 26 may be of many constructions, in this case providing a skeleton of cylindrical form having preferably four elemental side bars 29 of preferably generally triangular cross-section joined to the ends of similarly shaped cross bars 29_a_ forming a bottom closure. The elemental enclosure bars extend above collar 26 and lie flush against the inside surface of tubular neck 24.

As seen in FIG. 1C, catalyst stone enclosure 30 is preferably sealed at one end by a catalyst cap 34, preferably formed of an epoxy material. The stone enclosure 30 is gas permeable for the catalyst to aid in recombination of hydrogen and oxygen within the battery case to ensure the battery does not prematurely fail due to water loss caused by diffusion of hydrogen molecules through the battery case.

Aligned coaxial cage 28 and the catalyst stone enclosure 30 are located along the flow path. Catalyst stone enclosure 30 preferably has an axial dimension less than length of the cage such that enclosure 30 can move axially and there is free flow about enclosure 30. The radial dimension of stone enclosure 30 is selected to slidably engage the walls of catalyst cage 26. The movement of the stone enclosure 30 enables water condensate to drain from hydrating catalyst 32.

Gases residual to the electrolytic and condensation process are channeled inwardly toward the valve 36 as seen in FIG. 1C. The valve area as seen also in FIG. 1E includes valve stem receiving aperture 58, and surrounding valve openings 60. Relief valve 36 illustrated FIG. 1C is preferably a flexible inverted mushroom-shaped cap 76 preferably made of rubber and provided with an integral axial stem 72 extending through aperture 58. When stem 72 is snugly received in aperture 58, peripheral edge 76_a_ of valve cup 76 covering valve openings 60 rests atop recess 78, in sealing contact with the cup bottom in the closed valve position as seen in FIG. 1C. In this position, valve 76 seals closed the valve stem receiving aperture 58 and valve openings 60. Valve 36 is secured in position by engagement of its narrowed waist 72_a_ in aperture 58, providing a shoulder beneath the aperture which resists upward motion of the valve 36. Downward movement of valve 36 is precluded by the valve cup 76 which has a radial dimension much greater than valve stem receiving aperture 58.

As gas pressure builds within the battery case the gas passes between the elemental side bars and into the open interior 44 of lower cylindrical portion 15, to exert force on the underside of valve cap 76 and the edges of the mushroom-shaped valve cap 76 to unseat valve cap 76 from recessed seating surface 78.

Figure 1D:
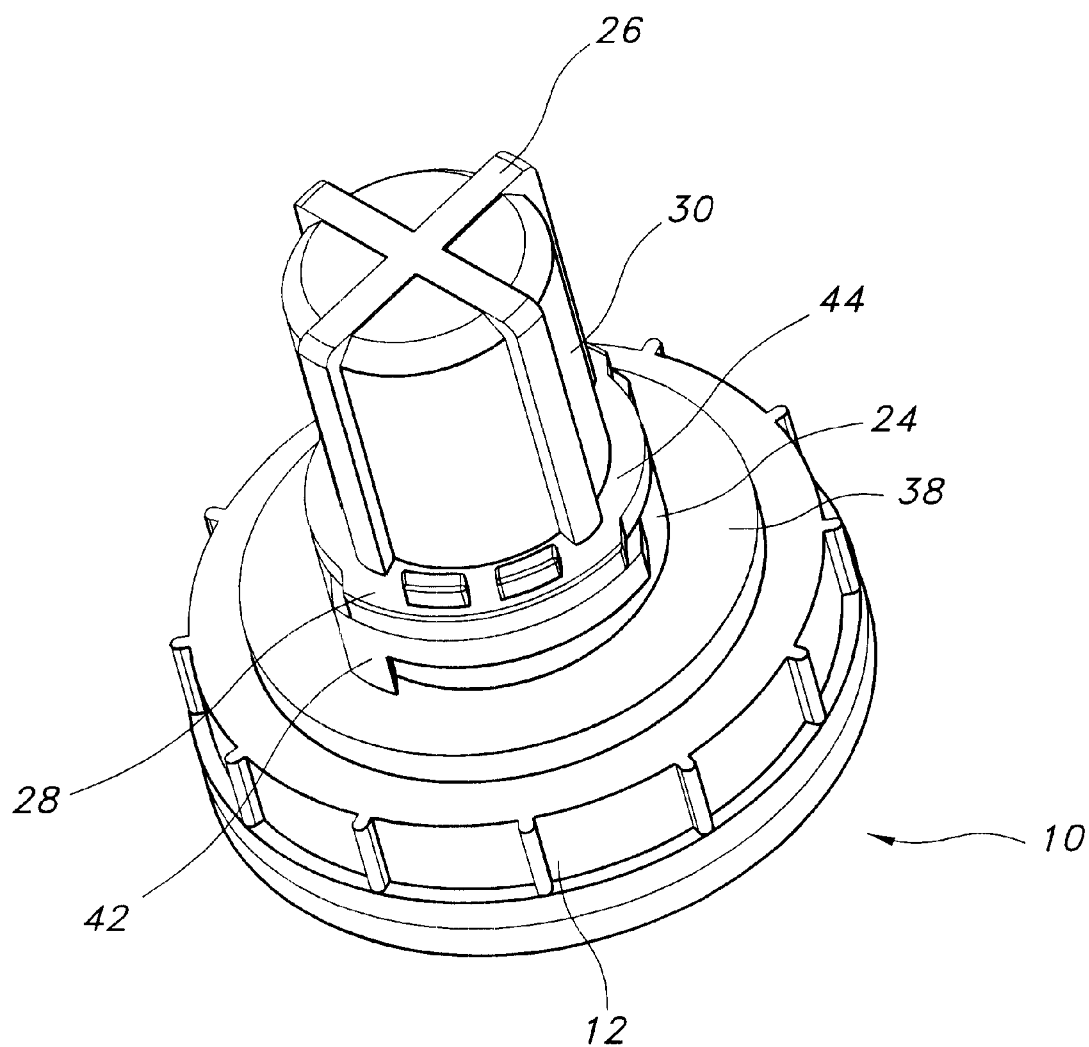
FIG. 1D is a perspective view of the battery vent valve-catalyst: carrier assembly inverted from the position illustrated in FIGS. 1A–1C.
Figure 1E:
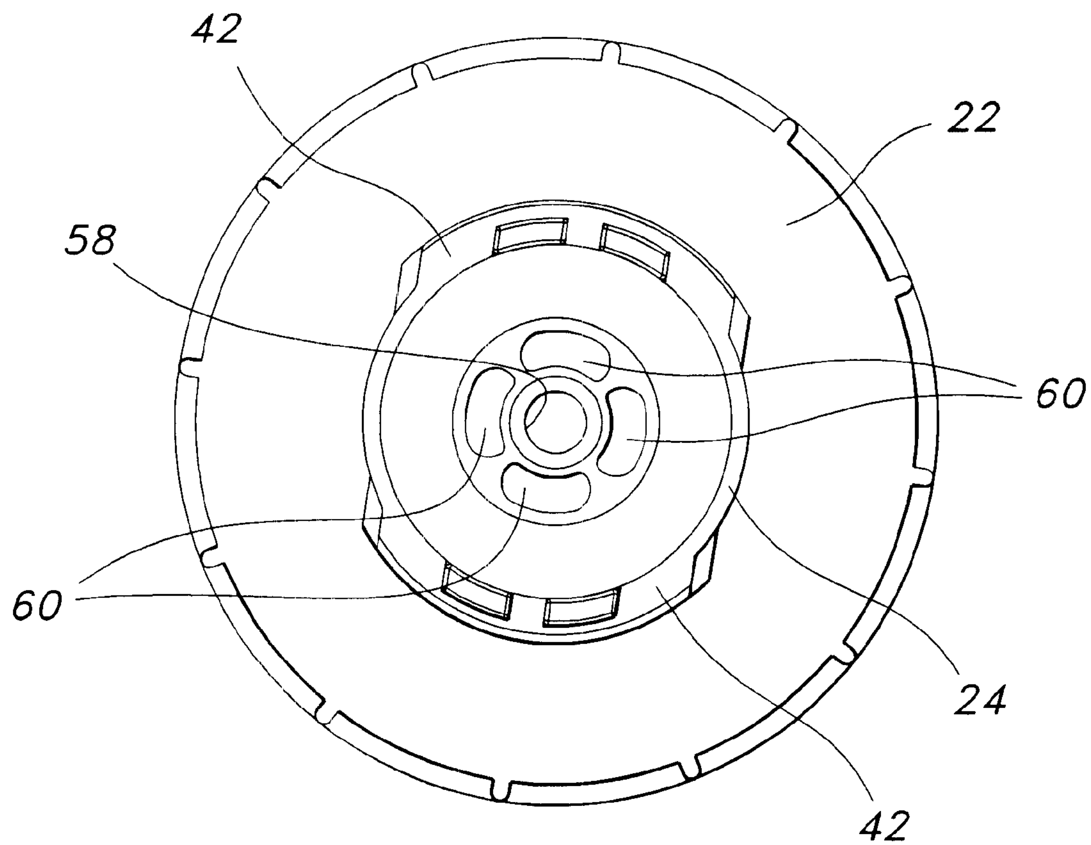
FIG. 1E is a bottom view of the battery vent valve-catalyst carrier assembly of FIG. 1A, before the catalyst carrier and support structure is added.

Open interior 44 of lower cylindrical portion 15 and the passageway for gas flow thereto is visible in FIG. 1D. The specific actuation properties of the valve to facilitate pressure release are determined by the properties of the rubber utilized to manufacture valve cap 76. For example, a rubber durometer value of 50 yields a differential pop-off pressure of 0.5 to 5.0 psi. As pressure rises above the durometer-controlled threshold, valve cap 76 unseats, discharging gas upwardly through valve openings 60.

Figure 3B:
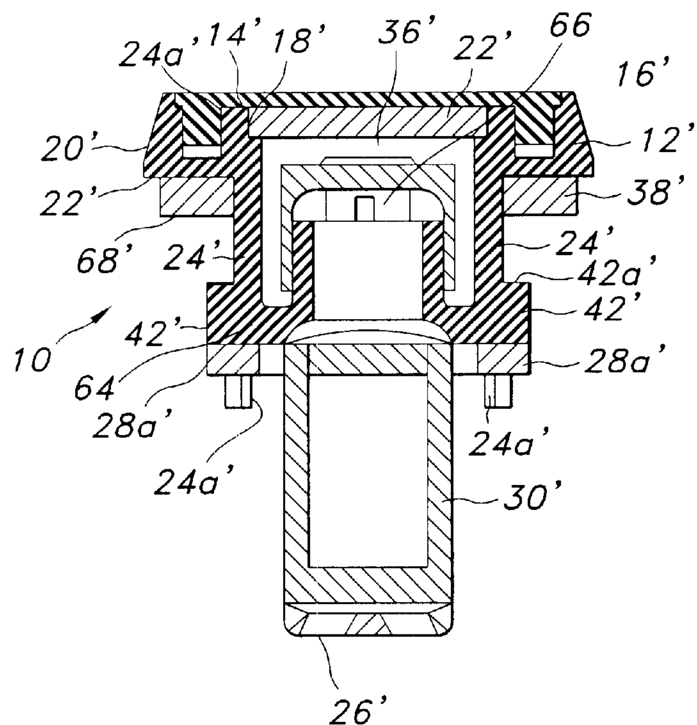
FIG. 3B is an axial vertical section of the structure of FIG. 3A.
Figure 3A:
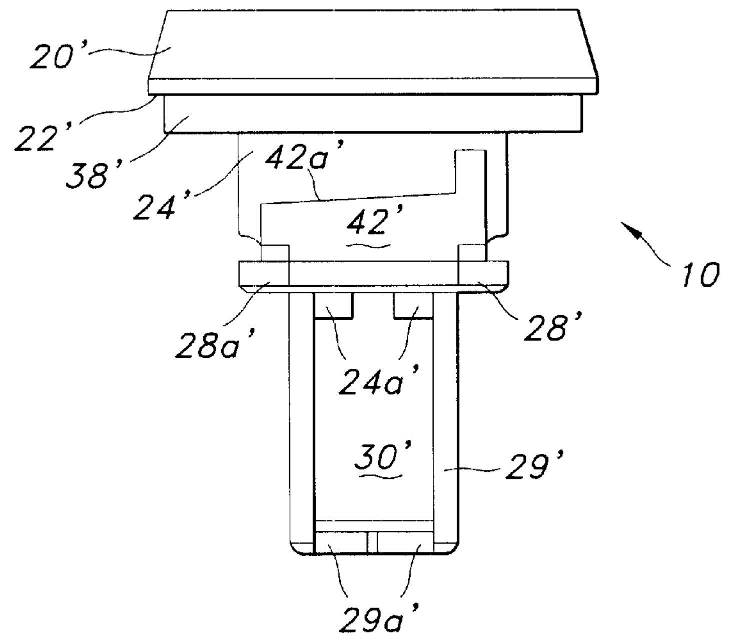
FIG. 3A is a side elevation of a modified type of vent valve-catalyst carrier assembly manifesting aspects of the invention.

FIGS. 3A and 3B show a vent valve-catalyst carrier combination employing a different valve construction but embodying broad structural features of the device of FIGS. 1A–1E. Since the structures are similar in many ways, corresponding parts have been given similar number designators with the addition of primes thereto.

In this embodiment neck 24', which is intended to fit into the vent opening in the case similar to that shown in FIG. 1C, has radially outwardly extending blocks 42' on the neck 24'. The upper surfaces of those blocks provide cam surfaces 42_a_' which cooperate with cam surfaces similar to cams 8_a_ in FIG. 1C on collar 6 of the case. The cup 12' no longer serves as part of the vent body. Instead, cup side walls 20' are connected to neck 24' by cup bottom 22' through which neck 24' extends, almost to the top of the sidewalls 20'. Thus an annular groove is formed to receive an annular flange 16' which is near the edge of cover 14'. Cover 14' is flush with the top edge of the cup sidewalls 20' so that not only is flow confined to within the neck 24', but a different appearance results. The valve is wholly within the neck 24' so that the vent channel is through an integrally molded barrier across the bottom of the neck 24' and not through the cup bottom. Again, a porous fire wall is provided by disk 22' which rests on shoulders 24_b_ at the top of neck 24'.

The outside profile seen in FIG. 3A is essentially the same as that of the structure of FIGS. 1A–1E and the insertion into the vent opening of the battery case and coupling to the case collar (not shown) is the same as described in connection with FIG. 1. Furthermore, the catalyst container may be the same with the same catalyst material sealed therein with epoxy in the same way and supported in the same structure, all of which is shown in FIGS. 2A–2C.

One difference has to do with the valve structure itself which consists of an integrally axially oriented cylindrical tubular member 62 preferably integrally molded with the same resinous material as the rest of the valve body to which it is connected by the barrier annular web 64 which extends inward from and lies flush to the bottom of neck 24'. At the top of the cylindrical tubular member is an integral ring 66 having radial slots 66_a_ through the ring to the top of the cylinder giving a castellated appearance. Covering the cylinder and integral castellated ring 66 is an inverted cup 68 preferably made of rubber, a rubber-like material or some other material having similar elastic resilient properties and good frictional adherence to the cylinder 62 and ring 66 which its sidewalls surround.

In this case, increase of differential pressure inside the battery to a predetermined amount above atmospheric moves the flexible, stretchable sidewalls of cup 68 away from the outside of the tubular cylindrical walls 62 and ring 66 so that gases pass through slots 66A down past the sidewalls of the cup up and through porous member 22' and out the vent holes 18' of the cover 14'. The durometer range number for cup 68 is essentially the same as for mushroom valve 76. In each case design and testing of the particular valve structure permits modifications of the flexible parts to relieve internal pressure at a designed level within acceptable tolerances.

Figure 4:
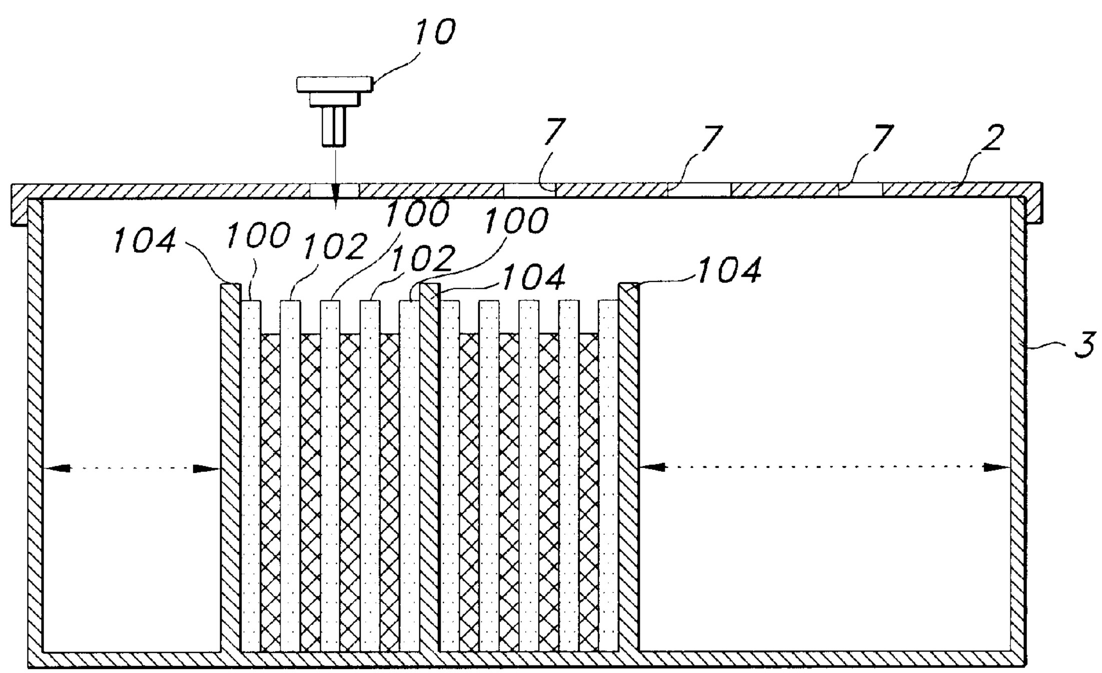
FIG. 4 is a schematic vertical section through a battery manifesting aspects of the invention.

FIG. 4 is a schematic representation of a battery with detail omitted for the purpose of showing the subject matter of the invention. This battery has a molded resinous case 106 including a jar 3 and a cover 4 of the same molded material. After the assembly of internal parts is completed, cover 4 is sealed to jar 3.

Case 106 has molded integrally with it internal partitions extending from the bottom of the case to above the general level of positive plates 100 and negative plates 102 and from wall to wall. The space above partitions 104 allows for interconnections of plates of the same polarity in each cell and to terminals (not shown) which penetrate cover 4 at various openings which are then sealed to the terminals.

In some cases the terminals serve many or all cells; in other cases individual terminals are provided for each cell. In the case where the partitions extend to cover 4, separate terminals are needed. Separate vent valve bodies may also be necessary, as well as separate catalyst containers.

The catalyst need not be supported from the bottom of the vent valve structure although this combination is a particularly convenient way to place a catalyst in a very advantageous position relative to the cell. The catalyst still has great importance when positioned elsewhere in the battery, for example with a separate catalyst unit for each cell where the cell defining walls essentially separate one cells from another. Separators 106 are placed between plates 100, 102 and in many cases hold much of the electrolyte needed to keep the battery fluid.

The form of battery illustrated is not intended to be limiting in any way and it should be understood that the invention is intended to pertain to many forms of lead-acid batteries.

The following is claimed:

1. A recombinant lead-acid battery comprising:

a. a case;

b. a plurality of lead-acid cells within said case, each cell comprising:

i. positive and negative lead metal plates;

ii. absorbent separator material between at least some of said positive and negative plates;

c. said cells being in vapor communication one with another;

d. a plurality of catalyst units in vapor communication with said cells for enhancing recombination of hydrogen and oxygen into water at least partially in vapor phase within said battery, said plurality of catalyst units being fewer in number than said plurality of lead-acid cells.

2. The battery of claim 1 wherein at least some of said catalyst units are at least partially within said case.

3. The battery of claim 1 wherein at least some of said catalyst units are completely within said case.

4. The battery of claim 1 wherein said catalyst units are completely within said case.

5. The battery of claim 1 wherein a catalyst within at least some of said catalyst units is palladium.

* * * * *